UNITED STATES PATENT OFFICE.

LEO H. BAEKELAND, OF YONKERS, AND AUGUST H. GOTTHELF, OF HASTINGS-UPON-HUDSON, NEW YORK.

PHENOLIC CONDENSATION PRODUCT AND PROCESS OF MAKING SAME.

1,217,115.  Specification of Letters Patent.  Patented Feb. 20, 1917.

No Drawing.  Application filed October 17, 1913.  Serial No. 795,780.

*To all whom it may concern:*

Be it known that we, (1) LEO H. BAEKELAND and (2) AUGUST H. GOTTHELF, citizens of the United States, residing at (1) Yonkers and (2) Hastings-upon-Hudson, in the county of Westchester and State of New York, have invented certain new and useful Improvements in Phenolic Condensation Products and Processes of Making Same, of which the following is a specification.

This invention relates to the production of so-called phenolic condensation products, the object of the invention being to prepare such products by reaction between a fusible phenolic condensation product, and a body possessing at least one methylene group in combination with another group, which, after yielding the methylene group to the phenolic body, engenders a substance possessing a low degree of volatility, combined with non-miscibility with water, low electrical conductivity, and the capacity of serving as a solid solvent in the product.

Heretofore phenolic condensation products, whether of the fusible and resinous or infusible and insoluble types, have been commonly prepared by reaction between phenolic bodies and bodies possessing reactive methylene groups combined with oxygen, as in formaldehyde, its polymers and hydrates; or with nitrogen as in hexamethylentetramin and similar methylene amins; or with halogens as in methylene dichlorid; or with alcoholic groups as in methylal; or with acid radicles as in methylene acetate. In case formaldehyde ($CH_2O$) or its hydrates, as methylene glycol, its polymers or the hydrates of its polymers, be used, water is formed in the ensuing reaction and may constitute a disturbing factor for certain purposes unless carefully removed; in case of certain methylene amins, such as hexamethylentetramin, ammonia is liberated and may likewise constitute a disturbing factor: in case of halogen compounds, the corresponding halogen acids are formed: in case of methylal, alcohol is set free; and in case of methylene esters such as methylene acetate, the corresponding acids are set free. In all methods heretofore used the production of the phenolic condensation product has been accompanied by the formation of another product, which, by reason of its relative volatility, tends, at the reacting-temperature, to separate as a gas; or if retained or combined in the final product, reduces materially its insulating properties, either by its low insulating value, or by attracting or retaining water.

The foregoing disadvantages are obviated by the present invention, according to which the group in conjunction with which the methylene is supplied is of such character that no products of low insulating-value, or attracting or retaining water or ammonia, or soluble in water, or of sufficient volatility to constitute a disturbing factor, can be formed.

A typical methylene compound suitable for use in conjunction with our invention is the substance which results from the reaction of formaldehyde upon anilin or from similar reactions and which has been designated as anhydro-formaldehyde-anilin $(C_6H_5N:CH_2)_3$ (Beilstein, "*Handbuch der Organischen Chemie*," third edition, vol. 2, page 442).

We have found that this substance is capable of entering into reaction with many phenolic bodies, yielding compounds which may vary widely in character according to the nature of the phenolic body chosen, the proportions of the reagents and the reacting-conditions. For instance, the product of the reaction may be permanently fusible or even liquid, or it may, when subjected to heat, undergo transformation into a hard, infusible and insoluble mass, or into a substance presenting characteristics intermediate these extremes.

Ordinary phenol or cresol, when caused to react directly with anhydro-formaldehyde-anilin, tends to yield liquid or pasty condensation products which are not rendered hard by simple heating, either under pressure or otherwise, unless by heating in open vessels for a long time at high temperatures.

Products of a harder and less fusible type are obtained when a portion of the methylene group entering into the constitution of the final product is supplied in other forms; and to secure the most favorable effects it has been found advisable to conduct the process, when such harder products are desired, in two or more stages. An example of such multi-stage process is as follows:—

We first prepare, according to any known or suitable method, a phenolic condensation product of the so-called fusible or resinous type, such as have been variously designated in the art as shellac-substitutes, novolak, phenol resins, saliretins, saliretin-bodies, and the like. Such resinous substances, hereinafter for convenience designated simply as "fusible phenolic resins," may be prepared for example by such methods as are described in the following patents and publications, to wit:—

British patents to Blumer 12,880 of 1902 and 6823 of 1903; De Laire French Patent 361,539, British 15,517 of 1905, German 189,262; British patent to Wetter (Knoll) 28,009 of 1907; Aylsworth U. S. Patents 1,020,593 and 1,029,737; Baekeland U. S. Patent 1,038,475; Baekeland "On Soluble, Fusible, Resinous Phenolic Condensation Products of Phenols and Formaldehyde," *Journ. of Industrial and Engineering Chemistry*, vol. 1, No. 8, 1909; "Phenol-Formaldehyde Condensation Products," same journal, vol. 4, No. 10, 1912; "The Chemical Constitution of Resinous Phenolic Condensation Products," same journal, vol. 5, No. 6, 1913, etc.

To the fusible phenolic resin, prepared in any desired or known manner, is added the required amount of anhydro-formaldehyde-anilin. The two substances may be simply mixed or melted together in proper proportions, and a primary product obtained which is solid, amorphous, resinous, insoluble in water, soluble in acetone, and mixtures of wood alcohol and acetone, and which is initially fusible but becomes infusible and considerably harder upon heating at a sufficiently high temperature, for example at 160° C. This heating may be done at ordinary atmospheric pressure or at pressures higher or lower than atmospheric pressure, because this product hardens without engendering disturbing gas or readily volatile substances; although as a rule for molding purposes and for obtaining a very compact and homogeneous product, an increased pressure is advantageous, because it prevents voids or irregularities due to mechanically interposed air. Such increased pressure may be applied in a heated hydraulic or other press, with simultaneous molding, or in a closed vessel or chamber, under pressure of a gas or liquid, according to the purpose intended.

In order to obtain a product of highest dielectric properties or of great insulating-value, it is desirable or essential that the fusible phenolic resin should be prepared with the necessary care, excluding or removing such impurities as might impair its insulating properties; for instance, it should be freed as far as practicable from water, or too great an excess of phenol, or disturbing condensing-agents, such as are employed in certain of the prior processes above referred to.

If only small proportions of anhydro-formaldehyde-anilin are used, the resulting product remains fusible, even after long heating, although it may become decidedly hardened. For instance, if we mix or melt 100 parts by weight of fusible phenolic resin with 20 parts of anhydro-formaldehyde-anilin, we obtain a resinous mass which on further application of heat, becomes harder or less fusible, but remains fusible and soluble, notwithstanding longer heating, and can thus be used as a substitute for shellac or other natural resin, serving for instance for the preparation of certain varnishes, not requiring infusibility.

If, however, the proportion of anhydro-formaldehyde-anilin be sufficiently increased, we obtain a primary product which after sufficiently long application of a sufficiently high temperature, becomes infusible and very hard after cooling, softening somewhat when again heated without however entering into fusion. In order to obtain such infusible product, we take, for instance, 100 parts by weight of suitably prepared fusible phenolic resin, and add thereto 100 parts of anhydro-formaldehyde-anilin, the mixture being finally heated to a temperature of about 160° C. until it is infusible. These proportions may be varied widely, allowing a slow transition and affording a wide range of products from the fusible products formed with relatively low proportions of anhydro-formaldehyde-anilin to the infusible products formed with relatively high proportions of anhydro-formaldehyde-anilin with all the advantages which this implies for the numerous special industrial applications of a product of this character. According to the character of the product desired, the proportion of anhydro-formaldehyde-anilin to 100 parts of fusible phenolic resin, may in ordinary practive vary from 20 to 200 parts, the lower proportions of anhydro-formaldehyde-anilin yielding decidedly fusible final products.

The resistance of the products to the action of such chemicals as alcohol, acetone and dilute caustic soda, increases with the proportion of anhydro-formaldehyde-anilin used. For example, products containing from 150 to 200 parts of anhydro-formaldehyde-anilin to 100 parts of fusible phenolic resin, were not apparently acted upon by 10% caustic soda solutions, or by methyl alcohol, after eleven days at room temperatures, and were only slightly softened by acetone.

The final products prepared as above may vary in appearance according to the nature and purity of the raw material, but are usually, in the absence of foreign additions, transparent masses of deep brown color.

The invention is not restricted to the use of anhydro-formaldehyde-anilin which is above described by way of illustration. Similar or equivalent methylene compounds which contain the methylene group in reactive condition, may be used, provided no readily-volatile byproducts or compounds of inferior insulating-value are engendered in the ensuing reaction.

The term "readily-volatile byproducts" is herein employed to designate such byproducts of reaction as water, ammonia, the halogen acids, alcohol, acetic acid and the like.

In the preparation of industrial products and compositions consisting of or containing the hereindescribed reaction products, it is to be understood that we may incorporate such substances, as for example those of a fibrous or cellular nature, or inert fillers or substances forming solid solutions, as are desirable for particular purposes; we may also employ heat and pressure to any required degree for hardening or molding operations; and, in general, we may apply such manipulations and devices and provide such additions as are now used in this art. The products formed in accordance with this invention are well adapted for use as varnishes, lacquers, paints, for impregnation, etc.

The high insulating-value of the products obtained in accordance with the present invention renders them particularly useful for electrical purposes, and especially for the formation of large blocks of insulating material or voluminous insulators; whereas with the hitherto known infusible phenolic condensation products such disturbing reaction products as water, hydration products, ammonia or ammonia compounds, and the like, cannot be eliminated from the interior of the voluminous articles made thereof.

Instead of effecting a direct reaction between the fusible phenolic resin and anhydro-formaldehyde-anilin, as above described, we may incorporate anilin with the fusible phenolic resin, together with any body possessing a mobile methylene group and serving to transform the fusible resin into a body of the infusible type, as described in Patent No. 1,038,475 to L. H. Baekeland; the reaction being carried out according to the present invention, in presence of the anilin or its derivates. Similarly, the anhydro-formaldehyde-anilin may be partially replaced by another body containing a mobile methylene group, or by mixtures of such bodies with anilin. Typical bodies possessing a mobile methylene group are formaldehyde, paraform, or trioxymethylene, methylene amins, as hexamethylentetramin or the like. For electrical purposes, at least, products thus formed are regarded as less desirable on account of the possibility of the retention in the hardened mass of small proportions of water, ammonia, or other disturbing bodies.

A further modification of the process consists in incorporating anhydro-formaldehyde-anilin with a phenolic condensation product which is directly transformable by simple heating into an infusible product, that is to say, which is capable of undergoing such transformation without the addition of anhydro-formaldehyde-anilin, or other bodies containing a mobile methylene group. For example, if we mix together equal parts of anhydro-formaldehyde-anilin and an initial phenolic condensation product which is itself directly transformable by heat into an infusible body, and the mixture be heated under conditions to accomplish such transformation, say at 160° C., it is found that the resulting body is decidedly harder and more resistive than the product resulting from heating such initial condensation product with a similar proportion of anilin; it moreover possesses a decidedly higher insulating-value.

It is self-evident that instead of using anilin or anhydro-formaldehyde-anilin, we may employ suitable homologues thereof.

The term "fusible phenolic condensation products" is used herein to include not only those fusible condensation products which are directly transformable by heat into infusible bodies, but also to include those fusible condensation products which are so transformable only in presence of bodies having a mobile methylene group, which latter class of bodies is herein designated "fusible phenolic resins."

This application is a continuation in part of our prior application Serial No. 776,847, filed July 1, 1913.

We claim:—

1. The process of preparing phenolic condensation products which consists in heating a fusible phenolic condensation product with a reactive methylene compound, which does not in the reaction, yield a readily-volatile byproduct.

2. The process of preparing phenolic condensation products which consists in heating a fusible phenolic condensation product with a sufficient proportion of a reactive methylene compound, which does not in the reaction yield a readily-volatile byproduct, and thereby producing an infusible final product.

3. The process of preparing phenolic condensation products which consists in heating a fusible phenolic condensation product with anhydro-formaldehyde-anilin.

4. The process of preparing phenolic condensation products which consists in heating a fusible phenolic condensation product with a sufficient proportion of anhydro-formaldehyde-anilin, and thereby producing an infusible final product.

5. The process of preparing phenolic condensation products which consists in heating a fusible phenolic resin with a reactive methylene compound, which does not in the reaction yield a readily-volatile byproduct.

6. The process of preparing phenolic condensation products which consists in heating a fusible phenolic resin with a sufficient proportion of a reactive methylene compound which does not in the reaction yield a readily-volatile byproduct, and thereby producing an infusible final product.

7. The process of preparing phenolic condensation products which consists in heating a fusible phenolic resin with anhydro-formaldehyde-anilin.

8. The process of preparing phenolic condensation products which consists in heating a fusible phenolic resin with a sufficient proportion of anhydro-formaldehyde anilin. and thereby producing an infusible final product.

9. The process of preparing phenolic condensation products which consists in heating a fusible phenolic condensation product with anilin and a body containing mobile methylene groups, or reaction products of anilin and such body.

10. The process of preparing phenolic condensation products which consists in heating a fusible phenolic resin with anilin and a body containing mobile methylene groups, or reaction products of anilin and such body.

11. The process of preparing phenolic condensation products, which consists in reacting upon a fusible phenolic resin with a body containing a reactive methylene group combined with another group which after yielding the methylene group to the phenolic body engenders a substance characterized by a low degree of volatility, non-miscibility with water, low electrical conductivity, and the capacity for entering into solid solution in the product.

12. As a new composition of matter, the product of reaction between a fusible phenolic resin and a reactive methylene compound which does not in the reaction yield a readily-volatile byproduct, said product characterized by its initial fusibility, and its capability of transformation by heat into a hard, homogeneous, non-porous product without evolution of a readily-volatile byproduct of reaction.

13. As a new composition of matter, the product of reaction between a fusible phenolic resin and anhydro-formaldehyde-anilin, said product characterized by its initial fusibility, and its capability of transformation by heat into a hard, homogeneous, non-porous product without evolution of a readily-volatile byproduct of reaction.

14. As a new composition of matter, the product of reaction between a fusible phenolic resin and anhydro-formaldehyde-anilin, said product being hard, homogeneous, non-porous, of high insulating-value and free from readily-volatile byproducts of reaction.

15. As a new composition of matter, the product of reaction between a fusible phenolic condensation product and anhydro-formaldehyde-anilin, said product being hard, homogeneous, non-porous, infusible, of high insulating-value and free from readily-volatile byproducts of reaction.

In testimony whereof, we affix our signatures in presence of two witnesses.

LEO H. BAEKELAND.
AUGUST H. GOTTHELF.

Witnesses:
HENRIETTA G. NEWMAN,
MARY E. SCHOLDING.